X-RAY IMAGE AMPLIFIER WITH MEANS TO
TILT THROUGH VERTICAL ANGLES
Filed Oct. 12, 1965

INVENTOR.
FLOYD L. GRAY
BY
Ralph G. Hohenfeldt
ATTORNEY

United States Patent Office 3,456,114
Patented July 15, 1969

3,456,114

X-RAY IMAGE AMPLIFIER WITH MEANS TO TILT THROUGH VERTICAL ANGLES

Floyd L. Gray, Hales Corners, Wis., assignor to General Electric Company, a corporation of New York Filed Oct. 12, 1965, Ser. No. 495,145
Int. Cl. H01j 5/48, 39/12, 37/20
U.S. Cl. 250—91 2 Claims

ABSTRACT OF THE DISCLOSURE

An X-ray image amplifier is carried on a horizontal shaft at the lower end of an overhead support so that the amplifier can be tilted through vertical angles. A C-arm has one of its ends connected to the amplifier through a bearing and its other end supporting an X-ray source so the source and amplifier remain aligned when the arm is swung. The bearing is adapted for being compressed radially to take up bearing free-play and insure alignment.

This invention pertains to diagnostic X-ray apparatus for taking X-ray views in a multiplicity of different planes or aspects without moving the subject relative to an X-ray table top.

The invention is especially useful for conducting angiographic and heart catherization procedures which involve studying the blood vessels and the structure and dynamics of the heart. In these procedures, the patient is immobilized on an X-ray transmissive table top which is mounted on an open-structured support for bilateral, or at least longitudinal, movement in a fixed plane. An X-ray contrast medium may be injected through an intravenous catheter to facilitate fluoroscopic examination of the heart and blood vessels. An X-ray tube is supported for movement to positions that are usually to the side of or below the subject and there is an oppositely mounted fluoroscopic device for visualizing the X-ray image. With this arrangement lateral, oblique, and posterior-anterior views of the subject may be taken.

The present invention is directed to equipment for carrying out procedures, similar to the above, more rapidly and conveniently than has been possible with equipment which has been available heretofore.

Accordingly, the invention features an X-ray image amplifier housing which is mounted for tilting on a horizontal axis through a large range of vertical angles. The horizontal axis is at or near the center of gravity of the assembly to avoid the need for any significant amount of counterweighting. The horizontal tilting shaft is in turn supported at the ends of vertically extensible columns which are attached at their upper ends to a turntable. The turntable is mounted on an overhead crane carriage which may be moved crosswise of a room on a bridge that rolls on tracks legnthwise of the room. Thus, the image amplifier and its attachments may be moved to any desired position, elevation or angle with respect to the subject on the table.

The new equipment features the use of an essentially C-shaped arm which has the X-ray source mounted at one end and an image amplifier at its other end. The axis of the image amplifier is thereby made coincident with and held in constant alignment with the central ray in the cone of rays that emanates from the X-ray tube. The X-ray tube and image amplifier are thus held at a fixed distance from each other regardless of the viewing aspect. The manner in which the C-arm is mounted, permits it to be rotated on a bearing structure about the common axis of the X-ray beam and the image amplifier with the X-ray tube focal spot remaining in the same aligned position and with the image amplifier remaining stationary. This feature enables the arm to be moved to any position for avoiding interference with the subject, the table, or the observer. Concomitantly, the observer does not have to change position to see the image from the amplifier when the C-arm is swung.

The bearing structure by which the C-arm is connected with the image amplifier housing has unique features. It is adapted to impart a substantially uniform stress on the bearing to control its axial free-play. The bearing permits the C-arm to rotate around the axis of the amplifier when it is urged to do so manually. A manual lock is also provided for securing the C-arm in any desired position.

The arrangement of the parts is such that the image amplifier may be located very near the subject while taking any view. This results in minimizing magnification and distortion of the X-ray image of the anatomy being examined.

In addition to the general objects mentioned above, more specific objects of this invention are to provide a multiplane fluoroscopic device that maintains an image amplifier type of fluoroscope in alignment with the X-ray source and at a constant distance therefrom; that permits access to all sides of the subject; that allows the tube support to be variously positioned and swung around the end of the X-ray table top or moved out of the way when desired without limiting the positions from which views may be taken; that minimizes the need for counterweights; that has a novel bearing retainer for reducing the free-play of the bearing and thereby maintaining axial alignment of the X-ray source and image amplifier.

The manner in which the foregoing and other more specific objects of this invention are achieved will now be described in greater detail in reference to the drawing in which.

Figure 4:
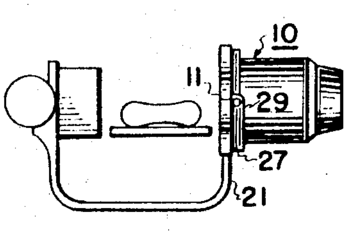
Figure 2:
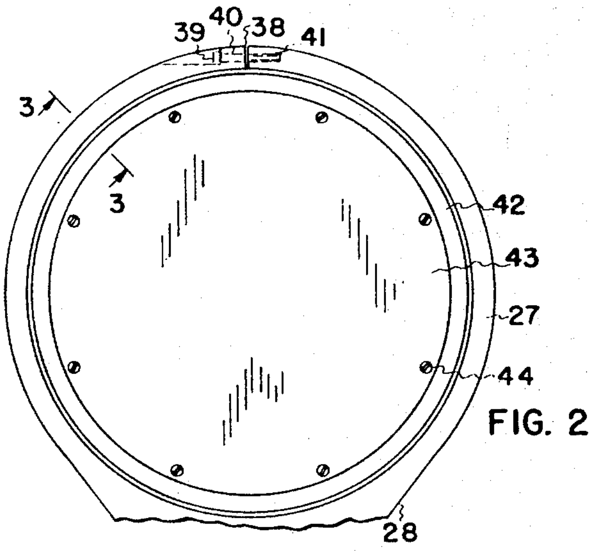
FIGURE 2 is a bottom view of the image amplifier, with parts broken away taken on a line corresponding with 2—2 in FIG. 1.
Figure 5:
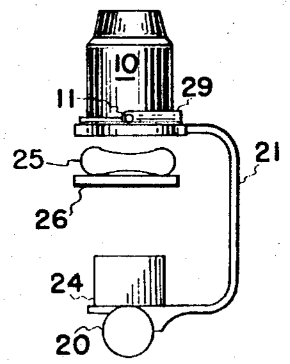
Figure 3:
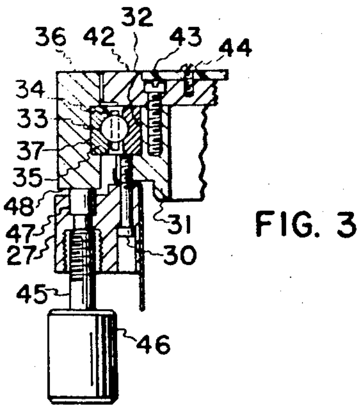

FIGURE 3 is a fragmentary cross-section of the bearing structure taken on a line corresponding with 3—3 in FIGURE 2, this view also shows a locking screw 45 which may be positioned elsewhere around the bearing retainer; and FIGURES 4 and 5 show the image amplifier assembly in outline and positioned respectively for taking a lateral and an anterior-posterior view of a subject.

Figure 1:
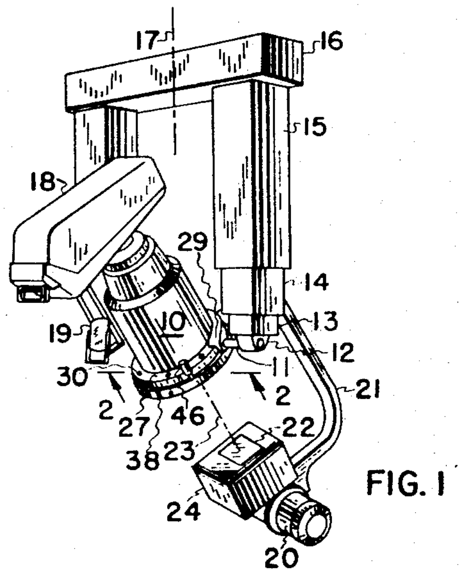
FIGURE 1 is an elevational view of diagnostic X-ray equipment embodying the invention.

Refer now to FIGURE 1 which shows an image amplifier housing 10 carried on horizontal shafts 11 which are journaled in a bearing structure 12. Each bearing 12 is fastened to vertically movable column section 13 which telescope in a next uppermost movable column section 14 which in turn telescopes in a fixed column section 15. There are two column assemblies, the uppermost section 15 of which are rigidly attached to a cross-arm 16. In a commercial embodiment of the invention, shafts 11 are provided with electric locks for holding the image amplifier 10 in any desired tilt position, but the locks are omitted for clarity.

Although it is not shown, there is an overhead turntable on which cross-arm 16 rotates about an axis that is symbolized by the broken line 17. Thus, it is seen that each of the stationary columns 15 and their affiliated telescoping columns 13 and 14 are adapted to orbit together around rotational axis 17. The turntable may be mounted on an overhead crane carriage so that the whole assembly may be translated across a room and the carriage may be mounted on an ordinary crane bridge for movement lengthwise of the room, these parts being omitted from the drawing because they are not necessary for describing the instant invention.

In the image amplifier housing 10, as shown in FIGURE 1, there is an X-ray image amplifier or converter tube of any well-known type. This kind of tube converts an X-ray image to a light image, and through some intermediate electron amplifying stages, to a minified intensely bright visible image again. The minified image is carried through an optical system which is not visible but is contained in an elogated housing 18. An exit opening in the bottom of housing 18 permits the magnified image to be viewed in a mirror 19 by an observer whose eyes may be about fifteen inches from the mirror.

In accordance with the present invention, the image amplifier housing 10 is coupled with an X-ray tube casing 20 by means of an esentially C-shaped arm 21. Fastened to X-ray tube casing 20 is an X-ray collimator 24 from which a cone of radiation is emitted through an exit window 22 when the X-ray tube is energized. The central beam of X-rays is symbolized by a dashed line 23 which is coincident with the image amplifier housing 10 axis and the focal spot of the X-ray tube. It may be seen that the C-arm 21 may be swung around axis 23 with the image amplifier housing 10 remaining stationary and the focal spot of the X-ray tube remaining at a fixed spatial point with respect to it. Swinging C-arm 21 as described does not change the distance between the focal spot of the X-ray tube and the bottom of the image amplifier housing.

For most X-ray examination procedures, it is desirable to have the image amplifier housing as near as possible to the patient 25 who is positioned on an X-ray transmissive table top 26 as may be seen for example in FIGURE 5. The universally movable mounting for the image amplifier housing 10 and X-ray tube 20 make this possible for all aspects of patient viewing between vertical as shown in FIGURE 5 and lateral as shown in FIGURE 4. Proximity of the amplifier 10 or other viewing device with the patient, of course, minimizes distortion and amplification of the X-ray image that is projected as a result of penetration of the subject 25 by a conical beam of rays emanating from X-ray tube 20. Moreover, it may be seen that if the operator desires to swing the C-arm 21 to the left side of the table from the right side in which it appears in FIGURE 5, this may readily be done by moving the crane lengthwise of the room and swinging the arm around the end of table top 26.

The details of the structure for connecting the C-arm 21 to image amplifier housing 10 through the agency of a ball bearing will now be examined. It will be observed in the various drawings, that image amplifier housing 10 is provided with a cast-on annulus 27 which has an extension 28, shown broken away in FIGURE 2, to which the C-arm is bolted conventionally. The horizontal tilting shafts 11 are also fixed in the annulus in an axially enlarged part 29 which may be seen best in FIGURE 1.

FIGURE 3 shows a fragmentary cross-section through part of the bottom of the image amplifier housing taken on a line corresponding with 3—3 in FIGURE 2 which in turn shows a plan view of the bottom of the housing. In FIGURE 3, it may be seen that annulus 27 supports the bearing assembly by means of a plurality of circumferentially spaced screws 30 which are also visible from the top in FIGURE 1. Screws 30 hold the bearing by engaging with a inner race supporting ring 31 which is dimensioned to receive the inner race 32 of a ball bearing. The ball bearing also includes the usual plurality of circumferentially spaced balls 33, brass ball spacers 34, and an outer race 35. The inner race 32 fits on the inner race ring 31 snugly, as shown. When these two parts are assembled, the bearing is inclined to rotate very freely and there is a tendency for the axes of the inner race 32 and outer race 35 to misalign. This is because commercially available bearings have free-play between their outer race inner ball grooves and the balls. This free-play or clearance may be only one ten-thousandth of an inch, but it will cause considerable axis misalignment between the image amplifier 10 and the X-ray source 20 when multiplied by the lever arm of the C-arm 21 which may be thirty inches from the center of rotation.

It will be seen, however, that axial alignment may be controlled in accordance with the invention by surrounding the outer race 35 of the bearing with a split retainer ring which is shown in cross-section and marked 36 in FIGURE 3. To accommodate the bearing, retainer ring 36 is provided with an internal groove 37 that accepts outer race 35 of the bearing. To permit retainer ring 36 to encompass the outer race 35 of the bearing in groove 37, it is necessary to spread or enlarge the retainer ring. For this purpose the retainer is split and provided with a small gap 38, see FIGURE 2. There is a clamping screw 39 which has a clearance hole surrounding its shank 40 and is threaded at 41 into retainer ring on the opposite side of the gap 38. Thus, after retainer ring 36 is spread by any suitable instrument entering the gap 38, sufficient clearance is developed to admit the bearing which will then nest in internal groove 37. Upon this event, screw 39 may be admitted and tightened to cause a radial pressure to be exerted around the entire periphery of the bearing. This radial force causes the outer race to yield inwardly and exert an axially directed pressure on the bearing balls 33 to effect tightening of the bearing any selected amount. The plane of the outer race 35 is thereby prevented from tiling with respect to the plane of the inner race 32.

The inner race 32 of the bearing is further retained on internal race ring 31 by means of a bottom ring 42 as can be seen in FIGURE 3. The bottom of ring 42 is closed by a fiber or other X-ray transparent disc 43 which protects the image amplifier tube within the housing against physical damage and imparts a smoother, better appearing bottom view of the image amplifier.

When the bearing assembly has been made as just described in connection with FIGURE 3, it may be positioned next to the image amplifier housing and fastened by means of the several screws 30. The C-arm 21 may then be bolted to the outer bearing retainer ring 36. After the X-ray tube 20 and collimator 24 are mounted on C-arm 21 the whole assembly can be tested for axial misalignment and adjustment may be made by tightening or loosening screw 39 in the retainer ring for increasing or decreasing pressure on the bearing until the desired amount of rigidity is achieved. With any bearing adjustment, the C-arm may be swung with a small manual effort. A small counterweight may be fastened to the front of the bearing retainer ring, in the vicinity of the retainer gap 38 for instance, to counterbalance the C-arm about the axis of the amplifier 10. This counterweight is not shown because it is simple and may be provided as needed by a designer.

Because it is necessary to assure that the parts will remain in their same relative position after they have been located for carrying on a particular X-ray examination, the device is provided with means for positively clamping the C-arm against rotation with respect to the image tube housing 10. In FIGURE 3, it may be seen that this is accomplished by a screw 45 which has a thumb nut 46 at its outer end and is provided with a plastic friction producing tip 47 at its other end. It may be seen that screw 45 is threaded into annulus 27 and that it will cause a frictional braking force, when turned in tightly, between tip 47 and a surface 48 on the outer bearing retainer ring 36. Thus, when the operator desires to swing C-arm 21, he may back off on screw 45, eliminate the braking effect, and swing the arm. When the amplifier and X-ray tube are again positioned for an examination, screw 45 may be tightened to preclude the C-arm from swinging.

Although a preferred embodiment of the invention has been described, such description is to be considered illustrative rather than limiting, for the invention may be variously embodied and is to be limited only by interpretation of the claims which follow.

It is claimed:

1. X-ray apparatus comprising:
(a) a support means including a vertical extending column,
(b) an X-ray image amplifier and a housing means therefor,
(c) means pivotally mounting said housing means on said column to permit tilting said housing means on a horizontal axis through vertical angles,
(d) a substantially C-shaped arm having an X-ray source attached at an end remote from the amplifier means,
(e) a bearing means journaled for rotation on the image amplifier housing means about the longitudinal axis of the image amplifier said bearing means being connected to the end of the C-arm remote from the X-ray source,
(f) whereby the C-arm may be swung around the axis of the bearing means and the housing while the X-ray tube remains in alignment with the image amplifier means.

2. A multiplane diagnostic X-ray apparatus comprising:
(a) a pair of vertically extensible columns on a common mount for orbiting around a vertical axis,
(b) an X-ray image amplifier and housing means therefor disposed between said columns,
(c) shafts projecting oppositely from near the bottom of said image amplifier housing means, said shafts being journaled near the lowermost ends of the columns, whereby to tilt said housing through vertical angles on a horizontal axis,
(d) a bearing attached to the housing in a plane that is near the bottom of the housing and the shafts, the bearing having a central opening for passing an X-ray image axially therethrough,
(e) a retainer means surrounding the bearing and supported on the bearing,
(f) a substantially C-shaped arm having one end fastened to the retainer means,
(g) an X-ray source attached to the other end of the arm remote from the image amplifier housing, said source being on the rotational axis of the bearing, whereby said C-arm may be swung with the X-ray source in constant alignment with the image amplifier means.

References Cited

UNITED STATES PATENTS 3,281,598 10/1966 Hollstein ............ 250—91

ARCHIE R. BORCHELT, Primary Examiner

S. C. SHEAR, Assistant Examiner

U.S. Cl. X.R.

250—52